(12) United States Patent
Takami

(10) Patent No.: US 6,873,403 B2
(45) Date of Patent: Mar. 29, 2005

(54) HALATION-PREVENTION FILTER, IMAGE ANALYSIS DEVICE EQUIPPED WITH SAID HALATION-PREVENTION FILTER, AND DIFFRACTION PATTERN INTENSITY ANALYSIS METHOD AND DIFFRACTION PATTERN INTENSITY CORRECTION PROGRAM THAT USE SAID HALATION-PREVENTION FILTER

(76) Inventor: Tomohide Takami, 39-2, Minamimagome 4-chome, ota-ku, Tokyo (JP), 143-0025

(*) Notice: Subject to any disclaimer, the term of this patent is extended or adjusted under 35 U.S.C. 154(b) by 0 days.

(21) Appl. No.: 10/806,970

(22) Filed: Mar. 23, 2004

(65) Prior Publication Data

US 2004/0173757 A1 Sep. 9, 2004

Related U.S. Application Data

(62) Division of application No. 10/136,542, filed on May 1, 2002, now abandoned.

(30) Foreign Application Priority Data

May 1, 2002 (JP) .................................. 2001-325324

(51) Int. Cl.[7] ............................................. G03B 27/43
(52) U.S. Cl. ........................ 355/67; 355/53; 355/77; 250/397
(58) Field of Search ........................ 250/306, 397; 355/67; 359/263

(56) References Cited

U.S. PATENT DOCUMENTS

| | | | |
|---|---|---|---|
| 4,904,578 A | 2/1990 | Tanaka et al. | 430/507 |
| 5,191,464 A * | 3/1993 | Hecht | 359/263 |
| 5,568,533 A * | 10/1996 | Kumazaki et al. | 378/156 |
| 6,200,738 B1 | 3/2001 | Takano et al. | 430/362 |
| 6,320,648 B1 * | 11/2001 | Brueck et al. | 355/67 |
| 6,462,340 B1 | 10/2002 | Inokuti | 250/310 |
| 6,545,778 B2 * | 4/2003 | Ono et al. | 359/13 |
| 6,628,355 B1 | 9/2003 | Takahara | 349/106 |
| 2001/0013959 A1 * | 8/2001 | Long | 359/2 |
| 2003/0189179 A1 * | 10/2003 | Leblans et al. | 250/484.4 |

FOREIGN PATENT DOCUMENTS

JP 07-006967 1/1995 ......... H01L/21/205

OTHER PUBLICATIONS

P. P. Debye, Phys. Zeits. vol. 40, p. 66 (1939).
P. P Debye, Phys. Zeits. vol. 40, p. 404–406 (1939).
H. Viervoll, Acta Chem. "Electron Diffraction Investigations of Molecular Structures." Sca. vol. 1, p. 120–132 (1947).
H. J. Yearian and W. M. Barss, J. "Aids to Analysis of Patterns Obtained in the Diffraction of Electrons by Gas." Appl. Phys. vol. 19, p. 700–704 (1947).
I. L. Karle and J. Karle, J. "Internal Motion and Molecular Structure Studies by Electron Diffraction" Chem. Phys. vol. 17, p. 1052–1058 (1949).
J. M. Hasting and S. H. Bauer, J. "An electron Diffraction Investigation of the Structure of Neoppently Chloride and Silco–Neopentyl Chloride." Chem. Phys. vol. 18, p. 13–26 (1950).

(Continued)

*Primary Examiner*—John R. Lee
*Assistant Examiner*—Johnnie L Smith, II
(74) *Attorney, Agent, or Firm*—Brown & Michaels PC

(57) ABSTRACT

An image analysis device 1 is equipped with the photoreceptive means 11 that optically acquires diffraction pattern A that appears on the fluorescent screen 24 in order to obtain the diffraction pattern resulting from reflection high-energy electron diffraction, and the halation-prevention filter 12 provided so as to transmit the visible light emitted from the diffraction pattern A of the fluorescent screen 24, along the light path connecting the photoreceptive means 11 and the fluorescent screen 24. Also, the filter 12 is varied so that the transmittance of the visible light transmitted through the filter 12 is minimum at the filter center and increases with the distance from the center.

4 Claims, 9 Drawing Sheets

OTHER PUBLICATIONS

K. Kuchitsu, Bull. "Electron Diffraction Investigation on the Molecular Structure of n–Butane." Chem. Soc. Jpn. vol. 32, p. 748–768 (1959).

Y, Morino, Y Nakamura, and T. Lijima, J. "Mean Square Amplitudes and Force Constants of Tetrahedral Molecules. I. Carbon Tetrachloride and Germanium Tetrachloride." ChemPhys. vol. 32, p. 643–652 (1960).

Y, Morino, and Y. Murata, "Mean–Square Amplitudes and Force Constants of Tetrahedral Molecules. II. Silicon Tetrachloride" Bull. Chem. Soc. Jpn. vol. 38, p. 104–113 (1965).

Kuchitsu, Kozo, Murata. Yoshitada Journal of Japanese Chemistry, vol. 20. No. 5. I–iv.(1966).

* cited by examiner

Fig. 6

| $I_c(x_i, y_i)$ | $(x_i, y_i)$ |
|---|---|
| . | . |
| . | . |
| . | . |
| . | . |
| . | . |

HALATION-PREVENTION FILTER, IMAGE ANALYSIS DEVICE EQUIPPED WITH SAID HALATION-PREVENTION FILTER, AND DIFFRACTION PATTERN INTENSITY ANALYSIS METHOD AND DIFFRACTION PATTERN INTENSITY CORRECTION PROGRAM THAT USE SAID HALATION-PREVENTION FILTER

REFERENCE TO RELATED APPLICATIONS

This is a divisional patent application of application Ser. No. 10/136,542, filed May 1, 2002, now abandoned, entitled "HALATION-PREVENTION FILTER, IMAGE ANALYSIS DEVICE EQUIPPED WITH SAID HALATION-PREVENTION FILTER, AND DIFFRACTION PATTERN INTENSITY ANALYSIS METHOD AND DIFFRACTION PATTERN INTENSITY CORRECTION PROGRAM THAT USE SAID HALATION-PREVENTION FILTER", which claimed an invention which was disclosed in Japanese application number 2001-325324, filed Oct. 12, 2001. The benefit under 35 USC §119(a) of the Japanese application is hereby claimed, and the aforementioned applications are hereby incorporated herein by reference.

BACKGROUND OF THE INVENTION

1. Field of the Invention

The present invention relates to a device that analyzes diffraction patterns resulting from reflection high-energy electron diffraction and an intensity analysis method, and it particularly relates to a halation-prevention filter that prevents diffraction pattern halation, an image analysis device equipped with the halation-prevention filter, and a diffraction pattern intensity analysis method and a diffraction pattern intensity correction program that use the halation-prevention filter.

2. Description of Related Art

Reflection high-energy electron diffraction is an analytical technique widely used in the molecular beam epitaxy field, as a technique for monitoring in real time the growth state, when growing crystals (e.g., metals, semiconductors) in vacuo.

In particular, ever since it was discovered that the atomic-layer-by-atomic-layer growth of crystals was observable by measuring the intensity of specular reflection point(s) in reflection high-energy electron diffraction, reflection high-energy electron diffraction has been recognized as a useful method for controlling crystal growth at the atomic layer level, so it has been applied to various industries (e.g., semiconductor device fabrication).

However, in image analysis devices that use the diffraction patterns resulting from conventional reflection high-energy electron diffraction, when a diffraction pattern is photographed, the intensities of the specular reflection point(s) are much greater than the intensities of the surrounding diffraction points and Kikuchi pattern, so the vicinity of the specular reflection point(s) produces halation. This becomes particularly significant when the entire diffraction pattern is photographed, and if the light exposure is decreased during photography in order to avoid halation, the following drawback results: the surrounding diffraction points and the Kikuchi pattern become unobservable because of the insufficient intensity (light intensity).

This problem frequently restricts, to the region between the specular reflection point(s) and the zero-order Laue zone, the conventional CCD camera-based observation of the diffraction pattern resulting from reflection high-energy electron diffraction, as the only way to avoid halation without decreasing the light exposure. However, when such an observation technique is used, the diffraction pattern information from outside the zero-order Laue zone is undetected, so a problem different from the aforementioned drawback is confronted: it is impossible to accurately analyze the sample state.

In a technique sometimes adopted in order to prevent the halation that occurs in a diffraction pattern when using a camera to photograph the diffraction pattern resulting from reflection high-energy electron diffraction, masking is performed when printing the photographic printing paper instead of in the photography state, thereby yielding a diffraction pattern with good contrast. This technique has a problem, however, in that linear intensity analysis is impossible because an irreversible correction is applied to the light intensity, which is essential for intensity analysis.

As another device configuration measure that prevents halation, there is a technique that uses sectors with a masking part and a transmissive part, between the fluorescent screen and the measurement sample in the vacuum chamber. To be more specific, in a sector, the masking part is configured by using a blade or vane with a geometrically computed shape. Furthermore, by making the electron beam, which is diffracted in the vicinity of the surface of the measurement sample, pass through the sector in which this blade rotates, the sector functions to inhibit halation near the center by physically decreasing the amount of electron beam passing through.

Actually, however, the mere adherence of minute dust particles on the blade markedly attenuates the intensity in the rotating part corresponding to this dust's position. An a result, this intensity attenuation affects the electron beam that forms the diffraction pattern, so the diffraction pattern does not accurately reflect the structure of the material. Consequently, not only must the blade be manufactured precisely, but it must be clean. Actually, however, the increased complexity of the adopted rotary mechanism also adds to the difficulty of completely eliminating dust, etc. From the standpoint of measurement precision, therefore, diffraction intensity analysis by means of such sectors set in vacuo is undesirable.

Furthermore, although Japanese Unexamined Patent Publication No. 7-6967 discloses an observation device that uses reflection high-energy electron diffraction, it merely suggests a configuration that uses a filter that selectively transmits only light of a specific wavelength. That is, it is based on the idea of handling as a bundle the light incident on the filter, but there is no suggestion of the idea of incrementally varying the light transmittance.

SUMMARY OF THE INVENTION

The present invention relates to a device that analyzes diffraction patterns resulting from reflection high-energy electron diffraction and an intensity analysis method, and it particularly relates to a halation-prevention filter that prevents diffraction pattern halation, an image analysis device equipped with the halation-prevention filter, and a diffraction pattern intensity analysis method and a diffraction pattern intensity correction program that use the halation-prevention filter. The halation-prevention filter is configured such that a transmittance of the visible light transmitted through the filter is lowest at a center of said filter and increases with a distance from said center. The present invention implements image analysis that enables the acquisition of diffraction patterns without halation and with good contrast. It also aims at implementing image analysis that enables the analysis of the intensity at all points in an obtained diffraction pattern.

BRIEF DESCRIPTION OF THE DRAWING

FIG. 6 shows a data structure diagram for the measurement intensity storage means equipped with the diffraction pattern intensity correction means shown in FIG. 5.

DETAILED DESCRIPTION OF THE INVENTION

Figure 1:
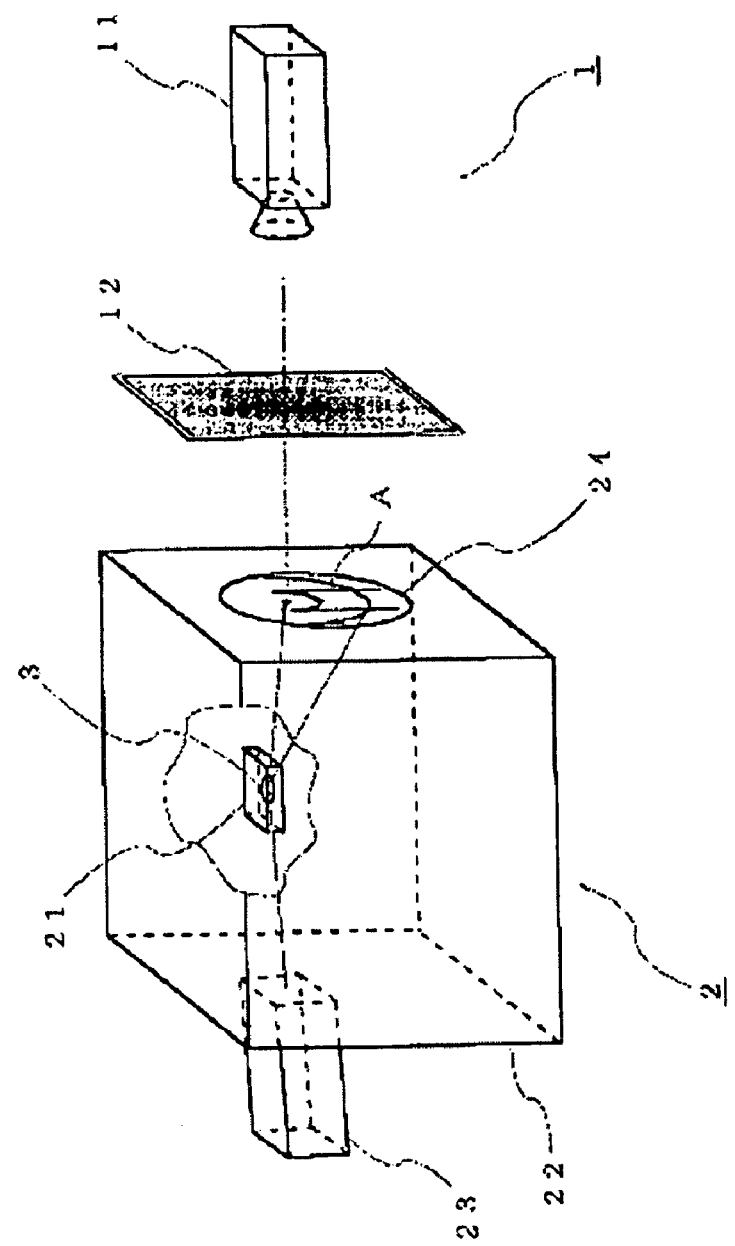
FIG. 1 shows an overall schematic diagram showing one example of the image analysis device of the first embodiment of the present invention.

To achieve the purposes, the present invention adopts a halation-prevention filter that is provided so as to transmit the visible light emitted from the diffraction pattern of the fluorescent screen, along the light path that connects the fluorescent screen on which the diffraction pattern appears as the result of reflection high-energy electron diffraction and the photoreceptive means that optically acquires the diffraction pattern. Also, the transmittance of the visible light transmitted through the filter is varied so as to be lowest at the center of the filter and to increase with the distance from the center.

According to the present invention, by varying the filter transmittance so that it is lowest at the filter center and increases with the distance from the center, it is possible to decrease the central intensity, thereby minimizing the difference in intensity between the center and the peripheral areas, even for diffraction patterns with a high central intensity.

Also, in the present invention, the configuration is such that the transmittance increases in proportion to $r^n$, where r is the distance from the filter center.

According to the present invention, the transmittance increases in proportion to the $n^{th}$ power of r, the distance from the filter center, so the present invention can eliminate the smoothing or flattening of transmittance near the center, in intermediate regions, and elsewhere.

The present invention also adopts an image analysis device equipped with a photoreceptive means that optically acquires the diffraction pattern appearing on the fluorescent screen used to obtain the diffraction pattern resulting from reflection high-energy electron diffraction, and it adopts a halation-prevention filter that is provided so as to transmit the visible light emitted from the diffraction pattern of the fluorescent screen, along the light path connecting the photoreceptive means and the fluorescent screen.

The filter varies the transmittance of the visible light transmitted through the filter, so that it is lowest at the center of the filter and increases with the distance from the center.

According to the present invention, by varying the filter transmittance so that it is lowest at the filter center and increases with the distance from the center, it is possible to decrease the central intensity, thereby minimizing the difference in intensity between the center and the peripheral areas, even for diffraction patterns with high central intensity.

The invention is configured so that the transmittance increases in proportion to $r^n$, where r is the distance from the filter center.

According to the present invention, the transmittance increases in proportion to the $n^{th}$ power of r, the distance from the filter center, so the present invention can eliminate the smoothing of transmittance near the center, in intermediate regions, and elsewhere.

The invention is also configured so that it has an in-plane or in-planar movement means that moves the halation-prevention filter in the plane orthogonal to the light path.

The present invention has an in-plane or in-planar or in-planar movement means, so it is possible to move the center of the halation-prevention filter.

The invention is also configured so that, in the image analysis device described, it is equipped with a photoemissive means that generates a point light source; an emission control means that controls the generation of the point light source of the photoemissive means; an intensity measurement means that measures, via the photoreceptive means, the intensity of the visible light emitted from the diffraction pattern of the fluorescent screen as well as the intensity of the visible light emitted from the point light source, that passes through the filter; an intensity decrease rate computation means that computes the rate of decrease in the intensity of the visible light transmitted through the filter, based on the intensity of the visible light emitted by the point light source, that was measured by the intensity measurement means; and a corrected-intensity computation means that computes the corrected intensity used to correct the intensity of the visible light emitted from the diffraction pattern of the fluorescent screen, that was measured by the photoreceptive means.

According to the present invention, the rate of decrease in the intensity of the visible light transmitted through the filter is computed, and, based on the rate of decrease, the corrected intensity resulting from the correction of the intensity of the visible light emitted from the diffraction pattern of the fluorescent screen is computed, so it is possible to obtain the intensity of the visible light actually emitted from the diffraction pattern of the fluorescent screen.

The invention also adopts the diffraction pattern intensity analysis method used to analyze the intensity of the visible light emitted from the diffraction pattern of the fluorescent screen as a result of reflection high-energy electron diffraction; and the method has a process that utilizes the photoreceptive means to measure the intensity of the diffraction pattern that appears on the fluorescent screen, via a halation-prevention filter such that the transmittance is minimum at the filter center and the transmittance increases with the distance from the center; a process that utilizes the photoreceptive means to measure the intensity of the point light source, via the filter, and obtains the rate of decrease in the intensity of the visible light transmitted through the filter, based on the measured results; and a process that, based on the rate of decrease, corrects the diffraction pattern intensity that was measured by the photoreceptive means.

According to the present invention, it is equipped with a process that measures the intensity of the diffraction pattern, via a halation-prevention filter that is varied so that the transmittance increases with the distance from the center, a process that obtains the rate of decrease in the intensity attributable to the filter, and a process that corrects the intensity of the diffraction pattern based on the decrease rate, so it is possible to obtain the intensity of the visible light actually emitted from the diffraction pattern.

The invention is configured so that the transmittance of the visible light transmitted through the filter increases in proportion to the $n^{th}$ power of r, where r is the distance from the filter center.

According to the present invention, the transmittance increases in proportion to the $n^{th}$ power of r, the distance from the filter center, so it is possible to optimally control the contrast over the entire diffraction pattern.

The invention implements a measured intensity storage means that stores the intensity of the visible light emitted from the diffraction pattern of a fluorescent screen, that was measured by the photoreceptive means after the light passed through a halation-prevention filter that is varied so that the transmittance when transmitting the visible light emitted from the diffraction pattern of a fluorescent screen as the result of the transmittance of the reflection high-energy electron diffraction is minimum at the filter center and increases with the distance from the center; an intensity decrease rate storage means that stores the rate of decrease in the intensity of the visible light that passes through the halation-prevention filter; and a corrected-intensity computation means that computes the corrected intensity of the diffraction pattern by correcting the intensity stored by the measured intensity storage means, based on the decrease rate stored by the intensity decrease rate storage means.

The present invention implements a measured intensity storage means that stores the diffraction pattern intensity measured by the photoreceptive means after the light passes through the halation-prevention filter that is varied so that the transmittance increases with the distance from the center; an intensity decrease rate storage means that stores the rate of decrease in the intensity of the visible light that passes through the halation-prevention filter; and a corrected-intensity computation means that computes the corrected intensity of the diffraction pattern by correcting the intensity stored by the measured intensity storage means, based on the decrease rate stored by the intensity decrease rate storage means. So, it is possible to correct the intensity of the diffraction pattern obtained via the halation-prevention filter.

The invention implements an intensity measurement means that measures the intensity of the visible light emitted by the point light source, that is measured by the photoreceptive means, via the halation-prevention filter that is changed so that the transmittance when transmitting the visible light emitted from the diffraction pattern of the fluorescent screen as the result of the transmittance of the reflection high-energy electron diffraction is minimum at the filter center and increases with the distance from the center; an intensity decrease rate computation means that computes the decrease rate, based on the intensity measured by the intensity measurement means and the reference intensity of the visible light that is emitted from the point light source but does not pass through the halation-prevention filter; an intensity decrease rate storage means that stores the decrease rate computed by the intensity decrease rate computation means; a measured intensity storage means that stores the intensity of the visible light emitted from the diffraction pattern of the fluorescent screen, that is measured by the photoreceptive means, via the halation-prevention filter; and a corrected-intensity computation means that computes the corrected intensity of the diffraction pattern by correcting the intensity stored by the measured intensity storage means, based on the decrease rate stored by the intensity decrease rate storage means.

The present invention implements an intensity measurement means that measures the intensity of the point light source, that is measured by the photoreceptive means, via the halation-prevention filter that is changed so that the transmittance increases with the distance from the center; an intensity decrease rate computation means that computes the decrease rate, based on the measured intensity and the reference intensity of the point light source that does not pass through the halation-prevention filter; an intensity decrease rate storage means that stores this decrease rate; a measured intensity storage means that stores the diffraction pattern intensity measured by the photoreceptive means, via the halation-prevention filter; and a corrected-intensity computation means that computes the corrected intensity of the diffraction pattern, based on the decrease rate stored by the intensity decrease rate storage means. So, it is possible to correct the intensity of the diffraction pattern obtained via the halation-prevention filter, according to the environment in which the halation-prevention filter is used. In this manner, the present invention attempts to achieve the aforementioned purposes.

Figure 2:
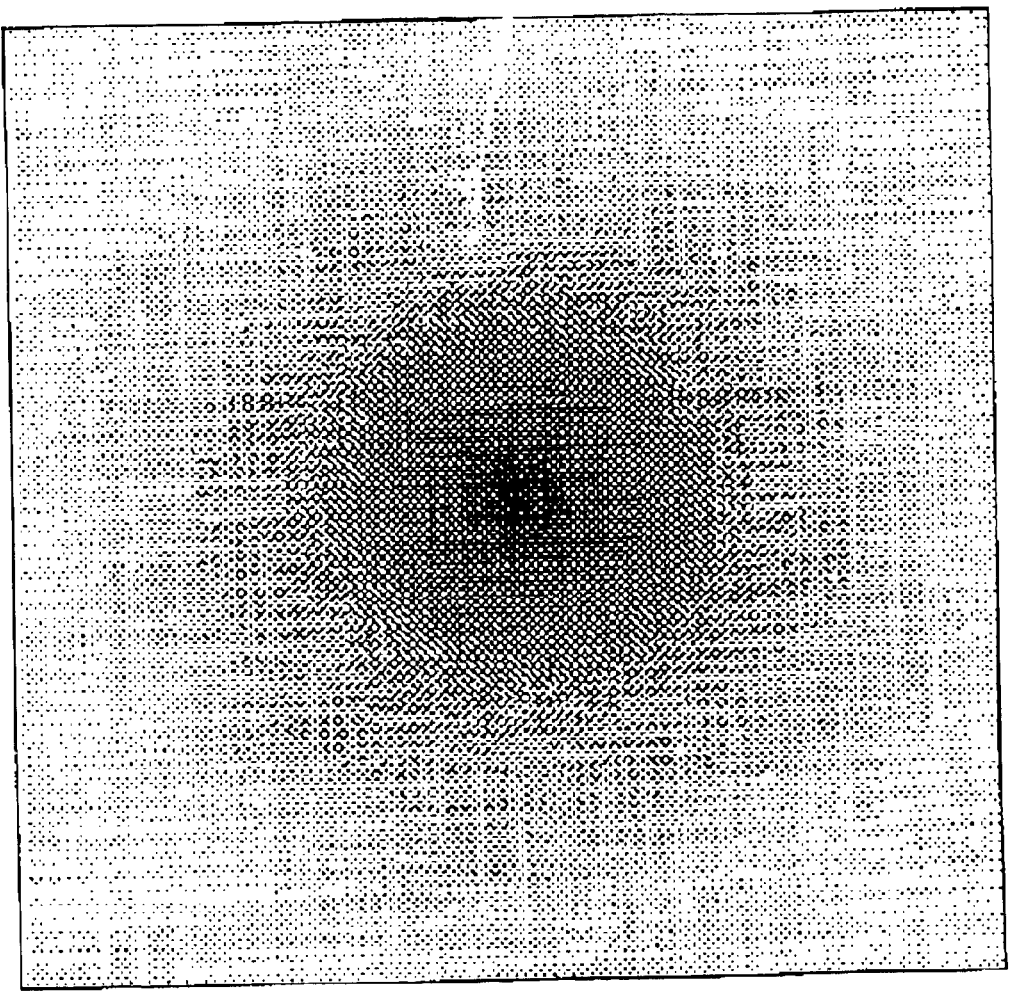
FIG. 2 shows a photograph showing one example of the halation-prevention filter shown in FIG. 1.

Next, one embodiment of the present invention will be explained, with reference to FIGS. 1 and 2. Here, FIG. 1 is an overall schematic diagram of one example of the image analysis device 1 of the present embodiment. FIG. 2 is a photograph showing one example of halation-prevention filter 12 used in image analysis device 1.

As shown in FIG. 1, the image analysis device 1 of the present embodiment is equipped with photoreceptive means 11 that optically acquires the diffraction pattern that appears on the fluorescent screen 24 for obtaining the diffraction pattern that results from reflection high-energy electron diffraction as well as with halation-prevention filter 12 that is provided, so as to transmit the visible light emitted from the diffraction pattern of the fluorescent screen, along the light path connecting the photoreceptive means 11 and the fluorescent screen 24. Furthermore, in FIG. 1, A represents the diffraction pattern.

To explain this in detail, in FIG. 1, the reflection high-energy electron diffraction device 2 is equipped with the vacuum chamber 22 in which is mounted the sample holder 21 that holds the measurement sample 3, the electron gun 23 that exposes the measurement sample 3 to an electron beam, and a fluorescent screen 24 on which appears the diffraction pattern resulting from the diffraction on the surface of the measurement sample 3.

As aforementioned, the image analysis device 1 is equipped with the photoreceptive means 11 that optically acquires the diffraction pattern appearing on the fluorescent screen 24 and the halation-prevention filter 12.

Here, the photoreceptive means 11 is the means of photographing, as moving images or still pictures, the diffraction pattern appearing on the fluorescent screen 24. Examples include a CCD camera, video camera, optical camera, etc. In photography by means of photoreceptive means 11, when conducting so-called in situ observation, which is used to observe changes in the crystal structures on the surface of the measurement sample 3 in the vacuum chamber, moving-picture photography is selected; when performing diffraction intensity analysis of the intensity of an obtained diffraction pattern, still-picture or moving-picture photography is selected.

As aforementioned, the halation-prevention filter 12 is provided in order to transmit the visible light emitted from the diffraction pattern on the fluorescent screen, along the light path connecting the fluorescent screen 24 on which the diffraction pattern appears as the result of reflection high-energy electron diffraction and the photoreceptive means 11 that optically acquires the diffraction pattern. It is varied so that the transmittance of the visible light transmitted through the filter 12 is minimum at the filter center and increases with the distance from the center. Furthermore, the transmittance indicates how much incident light is transmitted. 100% transmittance means transmission without modification and without light intensity reduction.

To be specific, the transmittance of the filter 12 is set so as to increase in proportion the $r^n$, where r is the distance from the center of the filter 12. That is, when light of location-independent, uniform intensity is transmitted to the filter, in the observed plane, the transmittance of the light density at in-plane or in-planar distance r from the center correlates proportionally to $r^n$.

The filter 12 is obtained by printing a gradient pattern on an optically transparent sheet or plate. Such a gradient pattern is readily obtainable by means of fine computer graphics. For example, the filter 12 can be fabricated by means of a technique that prints a gradient pattern on a transparent sheet.

One example of a concrete embodiment of this halation-prevention filter 12 is shown in FIG. 2. As shown in FIG. 2, the filter 12 has a gradient pattern that varies from the center to the periphery. Here, the filter 12 shown in FIG. 2 has the pattern that assumes that n=0.5, as the correlation with the aforementioned distance, and the transmittance gradient is such that the transmittance is lowest at the filter center and the transmittance at distance r from the center is $r^{0.5}$.

n=0.5 was derived as the result of tests conducted by the inventor of the present application, based on the fact that a CCD camera has a wider intensity dynamic range than does an optical camera. On the other hand, in the case of an optical camera, it is preferable to set n=3, as the attribute that maximizes the effectiveness of the filter 12.

Furthermore, as shown in FIG. 1, the filter 12 is positioned between the fluorescent screen 24 and a CCD camera, the photoreceptive means 11. In the present embodiment, if the fluorescent screen 24 has a diameter within the range from 100 mm to 200 mm, the distance from the fluorescent screen 24 to the CCD camera 11 is set within the range from 200 mm to 500 mm.

Next, the process used to obtain the diffraction pattern in the present embodiment will be explained. First, the measurement sample 3 to be measured is mounted in the sample holder 21. After the measurement sample 3 is placed in the sample holder 21, the interior of the vacuum chamber 22 is evacuated to the predetermined degree of vacuum. Then, the measurement sample 3 is exposed to the incident electron beam from the electron gun 23.

This incident electron beam is incident at a very small angle relative to the measured surface of measurement sample 3. Then the incident electron beam is reflected and diffracted by the atoms near the surface of the measurement sample 3. The incident electron beam is incident at a very small angle, so the measurement is surface sensitive. The reflected and diffracted electron beam produces an emission phenomenon in the fluorescent screen 24, so a spotted diffraction pattern corresponding to the atomic structure in the vicinity of the surface appears on the fluorescent screen 24.

The diffraction pattern that appears on this fluorescent screen 24 is obtained optically, via the filter 12, by means of the photoreceptive means 11. When the diffraction pattern is obtained, it is also possible to obtain in real time a sensitive diffraction pattern in the surface atomic structure of the measurement sample.

Here, when a photoreceptive means 11 (e.g., a CCD camera) that requires focusing is used, photographs are taken with the focus of the CCD camera 11 set for the fluorescent screen 24, so the pattern of the filter 12 does not appear directly on the photographed image. The decrease in the amount (i.e., intensity) of the visible light captured by the CCD camera 11 is reflected in the image, in the shape corresponding to the transmittance of the filter 12.

As a result, the CCD camera 11 is not focused on the filter 12, so even if the gradient pattern's resolution is somewhat low, the low resolution has minimal effect on the image photographed through the filter 12. So, during the manufacture of the filter 12 of the present embodiment, high pattern precision is not required, so it can be manufactured easily and inexpensively, which can be considered an advantage.

As explained previously, in the present embodiment, by varying the filter transmittance so that it is lowest at the filter center and increases with the distance from the center, it is possible to minimize the difference in intensity between the center and the peripheral area by decreasing the intensity of the central area, even in diffraction patterns with a high central intensity. Furthermore, even if the entire diffraction pattern is optically acquired, it is possible to provide an environment in which the entire, halation-free diffraction pattern can be obtained.

Also, in the photoreceptive means, it is possible to control the intensity of the visible light emitted from the diffraction pattern of the fluorescent screen, within the allowable, halation-free photoreceptive range.

Furthermore, because the transmittance increases in proportion to the $n^{th}$ power of r, the distance from the filter center, it is possible to eliminate the smoothing of transmittance near the center, in intermediate regions, and elsewhere. Furthermore, it is possible to make the transmittance highly distance dependent, so it is possible to effectively and sufficiently reduce light intensity in the vicinity of the center, compared with that in the periphery.

Figure 3:
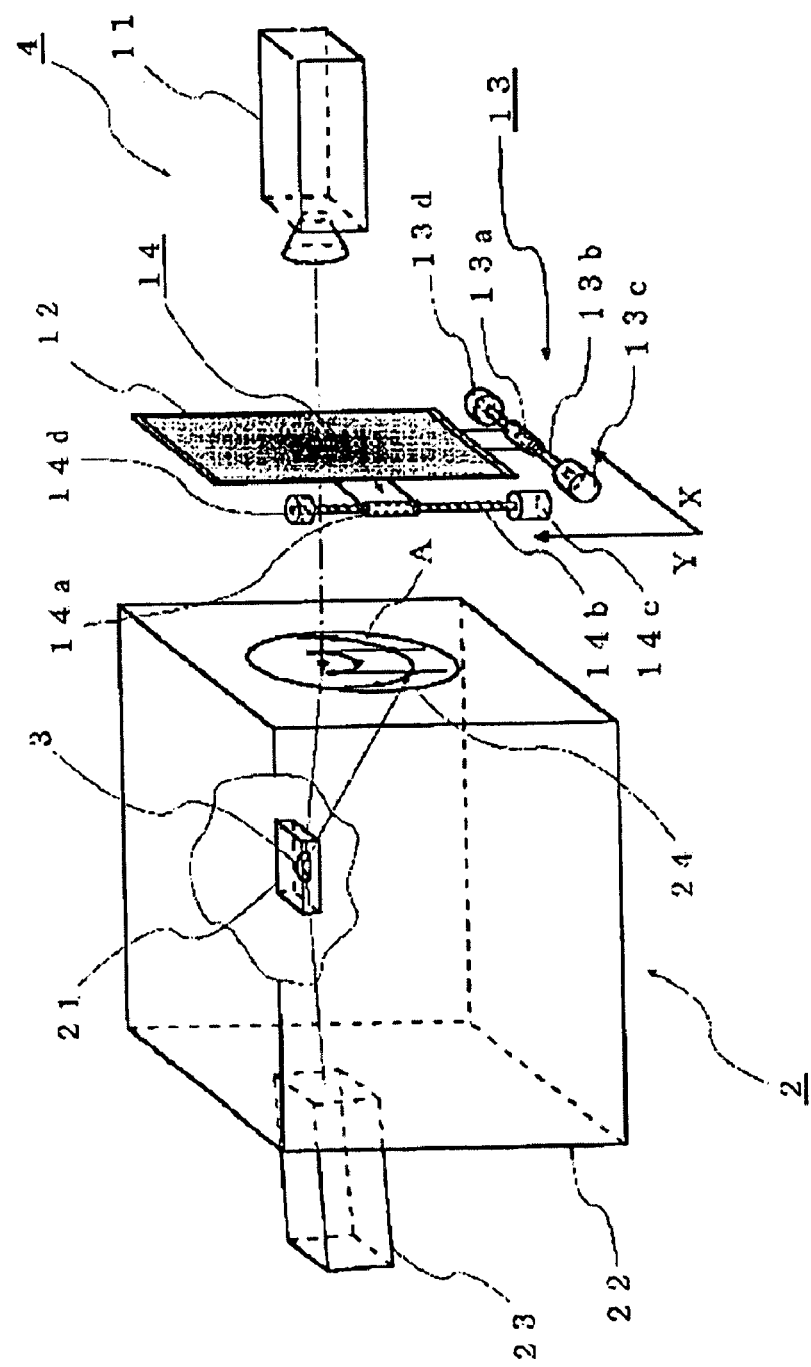
FIG. 3 shows an overall schematic diagram showing one example of the image analysis device of the second embodiment of the present invention.

Next, the second embodiment of the present invention will be explained with reference to FIG. 3. Here, components with the same structure as in the aforementioned first embodiment are keyed with the same symbols, so redundant descriptions are omitted. FIG. 3 is the overall schematic diagram showing the image analysis device 4 of the present embodiment.

In the present embodiment, the image analysis device 4 has, in addition to the configuration of the aforementioned first embodiment, the in-plane or in-planar movement means 13 and the in-plane or in-planar movement means 14 that move the halation-prevention filter 12 in the plane orthogonal to the light path connecting the photoreceptive means 11 and the fluorescent screen 24. However, in order to enable movement of the filter 12 to any in-plane or in-planar position, the in-plane or in-planar movement means 13 and the in-plane or in-planar movement means 14 move the filter 12 in different directions.

Such an in-plane or in-planar movement means is provided because, in the normal photography of reflection high-energy electron diffraction patterns, the specular reflection point(s) are positioned about halfway from the image center, so the position varies depending on the photography conditions.

Next, the present embodiment will be explained in detail. As shown in FIG. 3, the image analysis device 4 of the present embodiment is equipped with the x-direction in-plane or in-planar movement means 13 that moves the filter 12 in the x-direction in the figure and the y-direction in-plane or in-planar movement means 14 that moves the filter 12 in the y-direction in the figure, in the plane orthogonal to the light path connecting the photoreceptive means 11 and the fluorescent screen 24.

The x-direction in-plane or in-planar movement means 13 is composed of the x-direction movement element 13a that supports the filter 12, the x-direction lead screw shaft member 13b, the x-direction drive motor 13c, and the x-direction lead screw shaft bearing 13d.

Here, a through-hole is provided within the x-direction movement element 13a, and a female screw corresponding to the male screw part formed in the surface of the x-direction lead screw shaft member 13b is provided on the surface within this through-hole. Furthermore, one end of the x-direction lead screw shaft member 13b is supported by the bearing 13d, and the other end is connected to the x-direction drive motor 13c. This rotates forward and backward the x-direction drive motor 13c, thereby controlling the movement of filter 12 in the x-direction.

Similarly, the y-direction in-plane or in-planar movement means 14 is composed of the y-direction movement element 14a that supports the filter 12, the y-direction lead screw shaft member 14b, the y-direction drive motor 14c, and the y-direction lead screw shaft bearing 14d.

A through-hole is provided within the y-direction movement element 14a, and a female screw corresponding to the male screw part formed in the surface of y-direction lead screw shaft member 14b is provided on the surface within this through-hole. Furthermore, one end of the y-direction lead screw shaft member 14b is supported by the bearing 14d, and the other end is connected to the y-direction drive motor 14c. This rotates forward and backward the y-direction drive motor 14c, thereby controlling the movement of filter 12 in the y-direction.

During the use of the image analysis device 4 of the present embodiment, the photoreceptive means 11 obtains the diffraction pattern by controlling the aforementioned x-direction in-plane or in-planar movement means 13 and the y-direction in-plane or in-planar movement means 14, in order to align the center of the filter 12, where transmittance is lowest, with the position(s) of the specular reflection point(s) of the diffraction pattern.

To be specific, while a fixed distance is maintained between the fluorescent screen 24 and the filter 12 and between the filter 12 and the photoreceptive means 11, the x-direction drive motor 13c and the y-direction drive motor 14c are rotated in order to move the x-direction movement element 13a and the y-direction movement element 14a. For example, the filter position is set so that the filter center is aligned with the specular reflection point(s) of the fluorescent screen 24, when the diffraction pattern is viewed from the photoreceptive means 11, while displaying the image photographed by the photoreceptive means 11 on a monitor, etc. Then, the photoreceptive means 11 is used to photograph the diffraction pattern that appears on the fluorescent screen 24, via the center-aligned filter 12.

As explained previously, in the present embodiment has in-plane or in-planar movement means 13 and 14, so it is possible to move the center of the halation-prevention filter 12, thereby enabling the acquisition of the diffraction pattern appropriate to the displacement of the specular reflection point(s), which depends on the incident direction of the electron beam causing reflection high-energy electron diffraction. Furthermore, it is possible to provide an image analysis device 4 equipped with a highly flexible halation-prevention mechanism.

Figure 4:
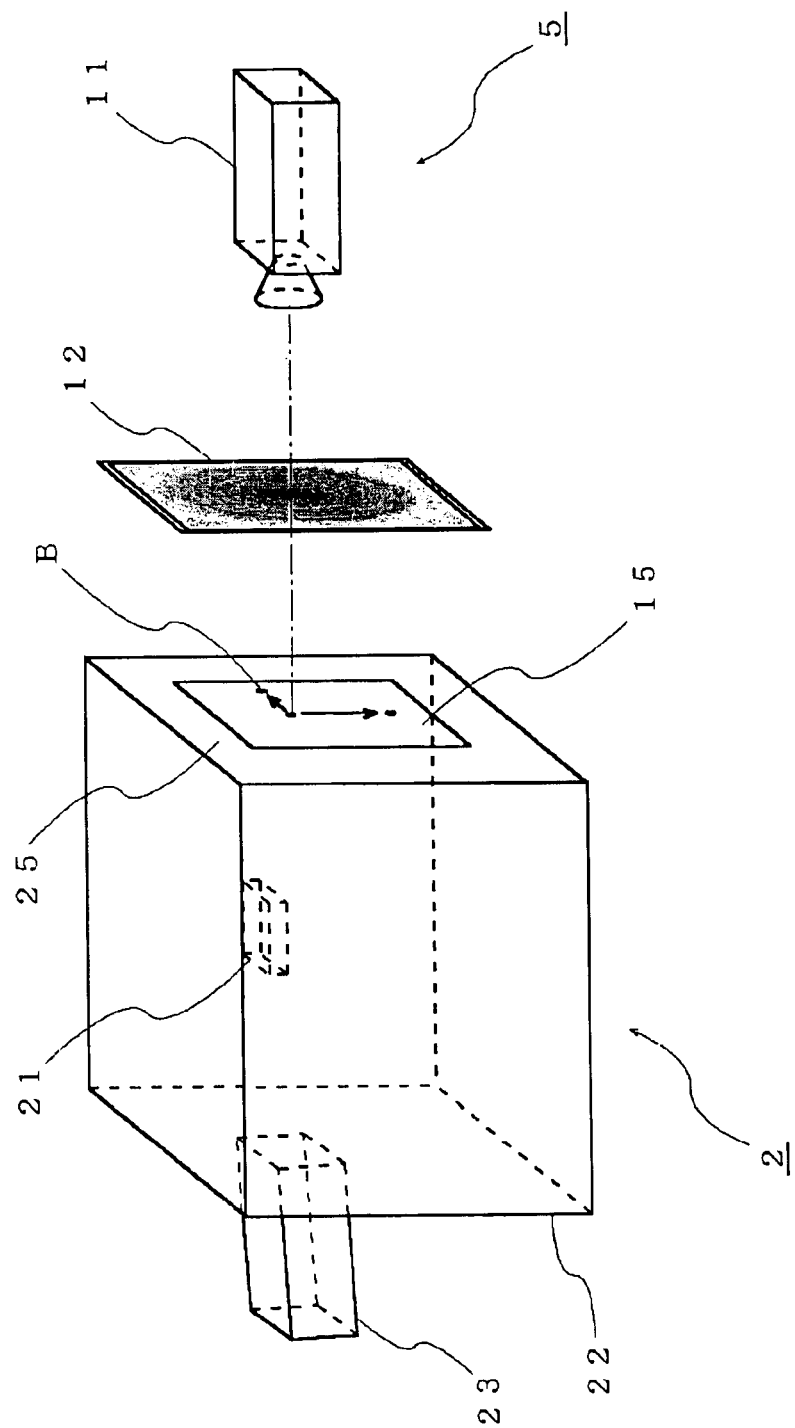
FIG. 4 shows a schematic diagram showing one example of the image analysis device of the third embodiment of the present invention.
Figure 5:
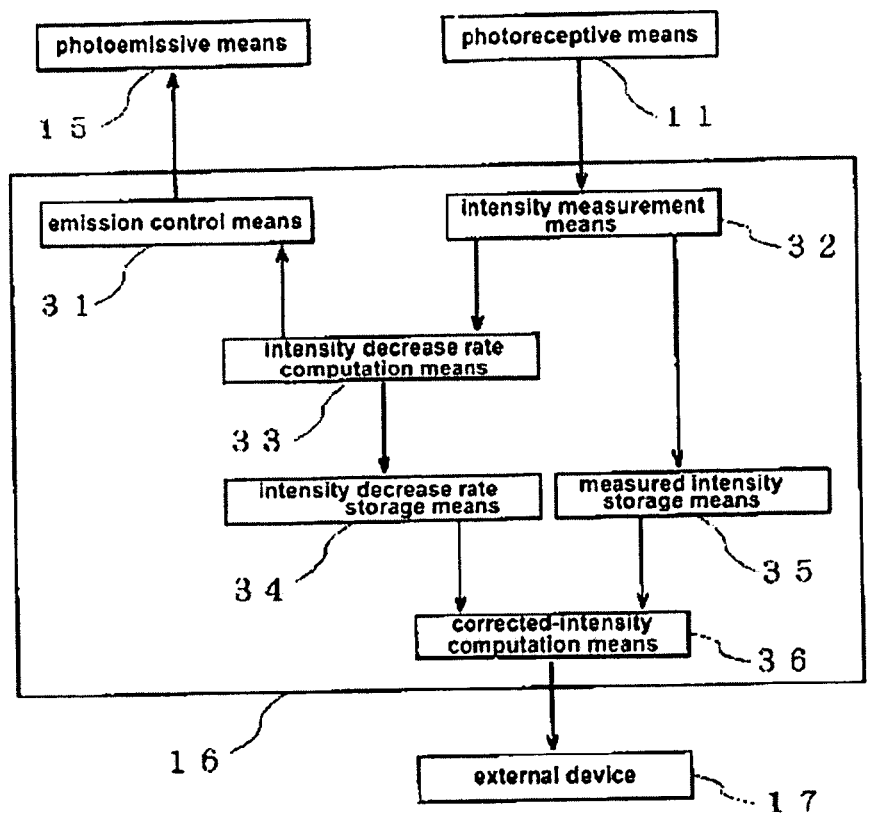
FIG. 5 shows a functional block diagram of the diffraction pattern intensity correction means equipped with the image analysis device shown in FIG. 4.
Figure 6:
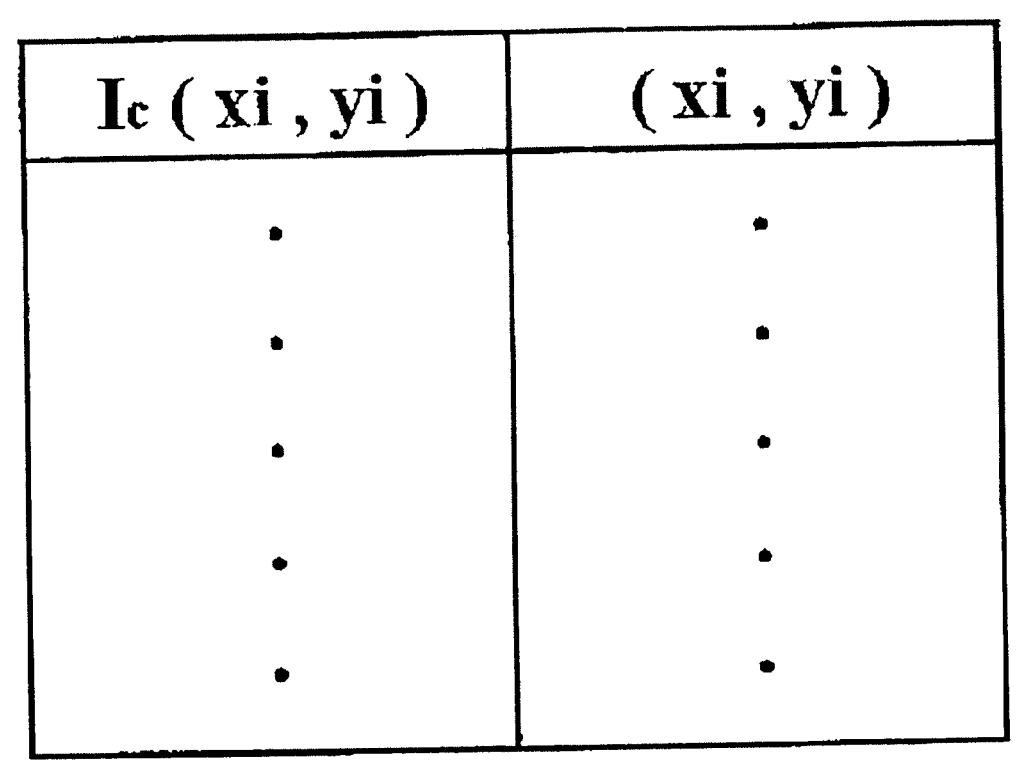

Next, the third embodiment of the present invention will be explained with reference to FIG. 1 and FIGS. 4–6. Here, components with the same structure as in the aforementioned embodiment are keyed with the same symbols, so redundant descriptions are omitted. Also, FIG. 4 is a schematic diagram showing the image analysis device 5 of the present embodiment. FIG. 5 is a functional block diagram of the diffraction pattern intensity correction means 16 equipped with the image analysis device 5. FIG. 6 is a data structure diagram of the measured intensity storage means 35 equipped with the diffraction pattern intensity correction means 16. Furthermore, in FIG. 4, □ represents the point light source.

The present embodiment was invented based on the realization of the fact that it is effective to take into consideration the effect of the filter 12 on the intensity of the visible light that is passed through the filter 12, in order to increase the accuracy of the intensity analysis that uses the image analysis device, when a configuration that prevents halation by obtaining a diffraction pattern through the filter 12 is adopted, as in the aforementioned first and second embodiments.

As shown in FIGS. 4 and 5, in addition to the basic structure (see FIG. 1) of the reflection high-energy electron diffraction device 2 with fluorescent screen 24 that was explained in the aforementioned first embodiment, the image analysis device 5 of the present embodiment is equipped with the photoemissive means 15 that generates the point light source, the emission control means 31 that controls the generation of the point light source of the photoemissive means 15, the intensity measurement means 32 that measures, via the photoreceptive means 11, the intensity through the filter 12 of the visible light emitted from the diffraction pattern of the fluorescent screen and the intensity through the filter 12 of the visible light emitted by the point light source, the intensity decrease rate computation means 33 that computes the rate of decrease in the intensity of the visible light transmitted through the filter 12, based on the intensity of the visible light emitted by the point light source, that was measured by the intensity measurement means 32, and the corrected-intensity computation means 36 that computes the corrected intensity obtained by correcting the intensity, as measured by the photoreceptive means 11, of the visible light emitted from the diffraction pattern of the fluorescent screen, based on the decrease rate computed by the intensity decrease rate computation means 33.

To be more specific, the photoemissive means 15 is the means (e.g., a liquid-crystal panel) of generating a point light source at any position, under the control of the emission control means 31 described later. As shown in FIG. 4, it is desirable to provide a detachable photoemissive means 15 where the fluorescent screen 24 is configured in the first embodiment. This is done in order to obtain the correction parameters in the environment in which the diffraction pattern is actually obtained, thereby enabling the most accurate correction.

Here, when adopting a method of mounting the photoemissive means 15 at the location where the fluorescent screen 24 is placed (e.g., by overlapping the fluorescent screen 24 with the photoemissive means 15), it is necessary to minimize the measurement condition error caused by an imperfect alignment with the placement position of the fluorescent screen 24. Concretely, the condition should be that [the error] is within the error range that is allowable in the later-mentioned correction, which takes into consideration the intensity decrease.

That is, as shown in FIG. 4, the distance between the photoemissive means 15 and the photoreceptive means 11 is adjusted so that it equals the distance (see FIG. 1) between the photoreceptive means 11 and the fluorescent screen 24 when obtaining the diffraction pattern, and the spacing between the photoreceptive means 11 and filter 12 when photographing the point light source is adjusted so that it equals the distance between the photoreceptive means 11 and the filter 12 when obtaining the diffraction pattern. However, it also is possible to adopt a method that approximates the corrected intensity, by adopting a configuration that yields an interrelationship similar to the positional relationship among the fluorescent screen 24, the filter 12, and the photoreceptive means 11.

Also, the emission control means 31, the intensity measurement means 32, the intensity decrease rate computation means 33, the intensity decrease rate storage means 34, the measured intensity storage means 35, and the corrected-intensity computation means 36 shown in FIG. 5 are implemented by the processing means and the storage means (not shown) that are provided in the diffraction pattern intensity correction means 16, which is equipped with the image analysis device 5. Furthermore, as the diffraction pattern intensity correction means 16 equipped with these means, an information processing device (e.g., a personal computer) that also analyzes the image information obtained by the photoreceptive means 11 is assumed.

The storage means is the means of storing information in a given region. Examples include so-called memory (e.g., RAM), storage media (e.g., HDD, CD-R), etc. However, it is not limited to a specific medium, and a configuration that combines multiple storage media may also be used.

Also, the processing means is a means of processing information that includes a computation means (e.g., a CPU), and it controls operations such as the input/output interface (not shown) that receives image information from the photoreceptive means and the aforementioned storage means, etc. However, it is not limited to a configuration that consists solely of one specific computation means, but it also may be configured with multiple computation means that enable the parallel processing of information.

The processing means implements the aforementioned emission control means 31, the intensity measurement means 32, the intensity decrease rate computation means 33, and the corrected-intensity computation means 36, when processing is initiated by external commands, etc., according to the diffraction pattern intensity correction program stored in a specific region of the storage means.

Here, the emission control means 31 is the means of controlling the generation of the point light source in the photoemissive means 15. By controlling so that the emission control means 31 emits light of a specific intensity at any point of the photoemissive means 15, it is possible to set at any position the point light source that emits the reference intensity, which is the reference for computing the intensity decrease rate mentioned later.

The intensity measurement means 32 is the means of obtaining the intensity (i.e., amount) of visible light at a specific point in the image information, based on the image information obtained by the photoreceptive means 11. The intensity measurement means 32 is used to measure not only the intensity of the light emitted by the point light source, but also to measure the intensity of the light emitted from the diffraction pattern of the aforementioned fluorescent screen.

The intensity decrease rate computation means 33 is the means of computing the rate of decrease in the point light source intensity, which is reduced by passing through the filter. Here, the intensity decrease rate is the parameter that represents how much the light emitted at any position is decreased by passing through the filter 12 with a varied transmittance, and it means that, when the intensity decrease rate is 0%, the intensity is not reduced by the filter 12, so the light intensity is not attenuated.

To be more specific, based on the point light source intensity measured by the intensity measurement means 32 and the theoretical or measured reference intensity of the visible light emitted by the point light source when it did not pass through the halation-prevention filter 12, the means computes how much the intensity of the visible light drops after passing through the filter 12, compared with the case where the filter 12 is not provided.

The intensity decrease rate storage means 34 is the means of storing the intensity decrease rate computed by the intensity decrease rate computation means 33, in predetermined areas in the aforementioned storage means (not shown), and it stores the intensity decrease rate by associating it with the point light source position (i.e., the specific positional coordinates on the fluorescent screen 24).

The measured intensity storage means 35 is the means of storing the intensity of the visible light emitted from the target, that is measured by the photoreceptive means 11, in a specific area in the aforementioned storage means (not shown). In the present embodiment, the intensity measurement means 32 stores the intensity of the diffraction pattern in cases where the diffraction pattern is measured after the light passes through the filter 12.

The corrected-intensity computation means 36 is the means of computing corrected intensities, for the intensities of the diffraction patterns stored by the measured intensity storage means 35, based on the intensity decrease rates stored by the intensity decrease rate storage means 34.

Furthermore, the external device 17 shown in FIG. 5 is a device that is connected to the diffraction pattern intensity correction means 16 and that receives the intensities of diffraction patterns after corrections obtained by means of the diffraction pattern intensity correction means 16. Examples include display monitors, other measuring instruments, etc.

By adopting the configuration of the present embodiment, it is possible to provide an environment that enables the acquisition of the intensity of the visible light actually emitted from the diffraction pattern of the fluorescent screen and enables the accurate analysis of the intensity, because the rate of decrease in the intensity of the visible light that passed through the filter is computed and, based thereupon, the corrected intensity, which is determined by correcting the intensity of the visible light emitted from the diffraction pattern of the fluorescent screen, is computed.

Also, the diffraction pattern intensity analysis of the present embodiment analyzes the intensity of the visible light emitted from the diffraction pattern of the fluorescent screen as the result of reflection high-energy electron diffraction. Also, as the diffraction pattern intensity analysis method, a method with the following processes was adopted: a process that utilizes the photoreceptive means 11 to measure the intensity of the diffraction pattern that appears on the fluorescent screen 24, via the halation-prevention filter 12 that is varied so that the transmittance is lowest at the center of the filter 12 and increases with the distance from the center; a process that utilizes the photoreceptive means to measure the intensity of the point light source via the filter, and then obtains the rate of decrease in the intensity of the visible light transmitted through the filter, based on the measurement results; and a process that corrects the diffraction pattern intensity measured by the photoreceptive means, based on the decrease rate.

When such a diffraction pattern intensity analysis method is adopted, it is possible to obtain the intensity of the visible light actually emitted from the diffraction pattern of the fluorescent screen, because it has a process that measures the intensity of the diffraction pattern, through the halation-prevention filter that is varied so that the transmittance increases with the distance from the center, a process that obtains the rate of intensity decrease caused by the filter, and a process that corrects the intensity of the diffraction pattern based on the decrease rate. Furthermore, accurate intensity analysis is possible.

Next, the diffraction pattern intensity correction program that implements the aforementioned emission control means 31, the intensity measurement means 32, the intensity decrease rate computation means 33, the corrected-intensity computation means 36, etc., will be explained in detail.

The diffraction pattern intensity correction program of the present embodiment implements the intensity measurement means 32 that measures the intensity of the visible light that is emitted by the point light source and is measured by the photoreceptive means 11, via the halation-prevention filter 12 that is varied so that the transmittance when transmitting the visible light emitted from the diffraction pattern of the fluorescent screen as the result of the transmittance of the reflection high-energy electron diffraction is minimum at the filter center and increases with the distance from the center; the intensity decrease rate computation means 33 that computes the decrease rate, based on the intensity measured by the intensity measurement means 32 and the reference intensity of the visible light that is emitted by the point light source but does not pass through the halation-prevention filter 12; the intensity decrease rate storage means 34 that stores the decrease rate computed by the intensity decrease rate computation means 33; the measured intensity storage means 35 that stores the intensity of the visible light emitted from the diffraction pattern of the fluorescent screen, that passes through the halation-prevention filter 12 and is measured by the photoreceptive means 11; and the corrected-intensity computation means 36 that computes the corrected intensity of the diffraction pattern, by correcting the intensity stored by the intensity storage means 35, based on the decrease rate stored by the intensity decrease rate storage means 34.

To be specific, the processing based on the aforementioned diffraction pattern intensity correction program is as follows: For light emitted from any point (x, y) on the fluorescent screen 24, the intensity decrease rate T(x, y) of the filter following measurement by using the photoreceptive means 11 is determined. Then the transmission-corrected intensity I(x, y) is determined based on the diffraction pattern's intensity $I_C(x, y)$, which was measured by using the photoreceptive means 11.

Hereinafter, processing based on the diffraction pattern intensity correction program is divided broadly into processing that computes the intensity decrease rate and processing the corrects the diffraction pattern intensity.

First, the sequence of processes used to compute the intensity decrease rate will be explained. The intensity decrease rate computation means 33 initially determines the intensity $I_O$ of the point light source used as the reference, after which it transfers the instruction information to the emission control means 31, in order to generate a point light source of that intensity. Based on the transferred instruction information, the emission control means 31 sends control information to the photoemissive means 15, in order to generate the point light source emitted at given intensity $I_O$ at given position (x1, y1). Based on the sent control information, the photoemissive means 15 generates the reference point light source at the given position (x1, y1).

Then, the intensity measurement means 32 measures the intensity $I_{OC}(x1, y1)$ of the point light source generated by the photoemissive means 15, via the photoreceptive means 11, with the transmittance-varied filter installed. Subsequently, the intensity measurement means 32 stores the measured intensity $I_{OC}(x1, y1)$ of the point light source in a given region of the storage means, after which it transfers the stored intensity $I_{OC}(x1, y1)$ to the intensity decrease rate computation means 33.

The intensity decrease rate computation means 33 that received the intensity $I_{OC}(x1, y1)$ (i.e., the measurement result) computes the intensity decrease rate T(x1, y1), based on the intensity $I_O$ transferred to the emission control means 31 and the received intensity $I_{OC}(x1, y1)$. The intensity decrease rate computation means 33 transfers the computed intensity decrease rate T(x1, y1) to the intensity decrease rate storage means 34.

Subsequently, the intensity decrease rate storage means 34 stores by associating the intensity decrease rate T(x1, y1) computed by the intensity decrease rate computation means 33 and the position coordinates (x1, y1). Finally, intensity decrease rate storage means 34 stores the intensity decrease rate $T(x_i, y_i)$ for each different position coordinates $(x_i, y_i)$ and functions as the database of intensity decrease rates when the filter 12 is used.

Next, the relationship among the point light source's measured intensity $I_{OC}(x_i, y_i)$, the reference intensity $I_O$, and the intensity decrease rate $T(x_i, y_i)$ is as shown in the following Equation 1.

$$T(x_i, y_i) = I_{OC}(x_i, y_i)/I_O \qquad (1)$$

Furthermore, for the position coordinates $(x_i, y_i)$, the fluorescent screen 24 of the reflection high-energy electron diffraction device 2 is provided. Also, they may be expressed as the absolute coordinates of the installation surface 25 on which the photoemissive means 15 is installed or they may be expressed as the relative coordinates from the center of the filter 12.

The aforementioned are the series of processes used to compute the intensity decrease rate by using a point light source. Hereinafter, the present invention evolves into a series of processes used to correct the intensity of the diffraction pattern, by using the computed intensity decrease rate. The process used to correct the intensity of a diffraction pattern will be explained next.

First, as in the aforementioned embodiment, the diffraction pattern is acquired optically, via photoreceptive means 11, while using filter 12. This diffraction pattern is obtained under the control of the intensity measurement means 32. The intensity measurement means 32 transfers the measured intensity $I_C(x_i, y_i)$ of the diffraction pattern and its position coordinates $(x_i, y_i)$ to the measured intensity storage means 35.

As shown in FIG. 6, the measurement intensity storage means 35 stores by associating the measured intensity $I_C(x_i, y_i)$ and the position coordinates $(x_i, y_i)$. Furthermore, although many measured intensities $I_C$ are preferable, it is suffices to measure according to the position of the luminescent spot of the diffraction pattern targeted for analysis.

Then, the corrected intensity computation means 36 receives the measured intensity $I_C(x_i, y_i)$ and the position coordinates $(x_i, y_i)$ from the measured intensity storage means 35 and receives intensity decrease rate $T(x_i, y_i)$ from the intensity decrease rate storage means 34, after which it computes the corrected intensity $I(x_i, y_i)$ (i.e., the actual intensity), with the received position coordinates $(x_i, y_i)$ as the index. Then, the corrected-intensity computation means 36 transfers the corrected intensity $I(x_i, y_i)$ to the external device 17, such as a display monitor or another measuring instrument.

Here, the relationship among the measured diffraction pattern's measured intensity $I_C(x_i, y_i)$ and intensity decrease rate $T(x_i, y_i)$ and the corrected diffraction pattern's intensity $I(x_i, y_i)$ is as shown in the following Equation 2.

$$I(x_i, y_i) = I_C(x_i, y_i) \times T(x_i, y_i) \qquad (2)$$

As explained previously, the present embodiment implements the intensity measurement means 32 that measures the intensity of the point light source measured by the photoreceptive means 11, via the halation-prevention filter 12 that is varied so that its transmittance increases with the distance from the center, the intensity decrease rate computation means 33 that computes the decrease rate based on the measured intensity and the reference intensity of the point light source when it does not pass through the halation-prevention filter 12, the intensity decrease rate storage means 34 that stores the decrease rate, the measured intensity storage means 35 that stores the diffraction pattern intensity measured by the photoreceptive means 11, via the halation-prevention filter 12, and the corrected-intensity computation means 36 that computes the corrected intensity of the diffraction based on the decrease rate stored by the intensity decrease rate storage means 34, thereby enabling the correction of the diffraction pattern intensity obtained via the halation-prevention filter 12, according to the environment in which the halation-prevention filter 12 is used, and thereby enabling the acquisition of the precisely corrected or calibrated intensity of the visible light actually emitted from the diffraction pattern of the fluorescent screen.

Here, the present embodiment is not limited to the aforementioned embodiments. For example, the correction of the diffraction pattern intensity by means of the aforementioned procedure is not limited to the correction of intensity information represented by numbers of a specific unit system (e.g., candela), based on the obtained decrease rate. Instead of correcting numbers, it also is possible to correct the optical intensity information by, for example, subjecting to image processing the image information itself that indicates the diffraction pattern, based on the obtained decrease rate.

Also, although the present embodiment adopted a configuration that is based on the first embodiment and is equipped with the photoemissive means 15, the diffraction pattern intensity correction means 16, etc., based on the first embodiment, it also is possible to substitute a configuration that is based on the second embodiment and is equipped with the photoemissive means 15, the diffraction pattern intensity correction means 16, etc.

Moreover, the aforementioned diffraction pattern intensity correction program is not limited to a form such that it is installed in a so-called preinstalled form on a storage means (e.g., HDD). It also may be in the form such that it is stored in a compressed form as an installable program on a portable storage medium (e.g., CD-ROM, DVD-ROM), or in which it is installed as required on equipment (e.g., a personal computer).

The deformation or distortion example of the aforementioned third embodiment will be explained with reference to FIG. 7. Here, components with the same structure as in the aforementioned embodiment are keyed with the same symbols, so redundant descriptions are omitted. Also, FIG. 7 is a functional block diagram of the diffraction intensity correction means 18 of the present deformation example.

The present deformation example resulted from focusing on the fact that intensity analysis can be facilitated by adding, to a any commercial intensity analysis program (i.e., software), a routine that corrects the intensity by using an equation with terms $I(x, y)$ and $T(x, y)$, as explained in a previous embodiment.

In an image analysis device for the filter 12, that does not require actual measurement for intensity correction when, for example, the predetermined specifications (e.g., the lens aperture and resolution of the photoreceptive means 11) are already clear, it is possible to adopt a packaged configuration that embeds the correction details as defaults.

Figure 7:
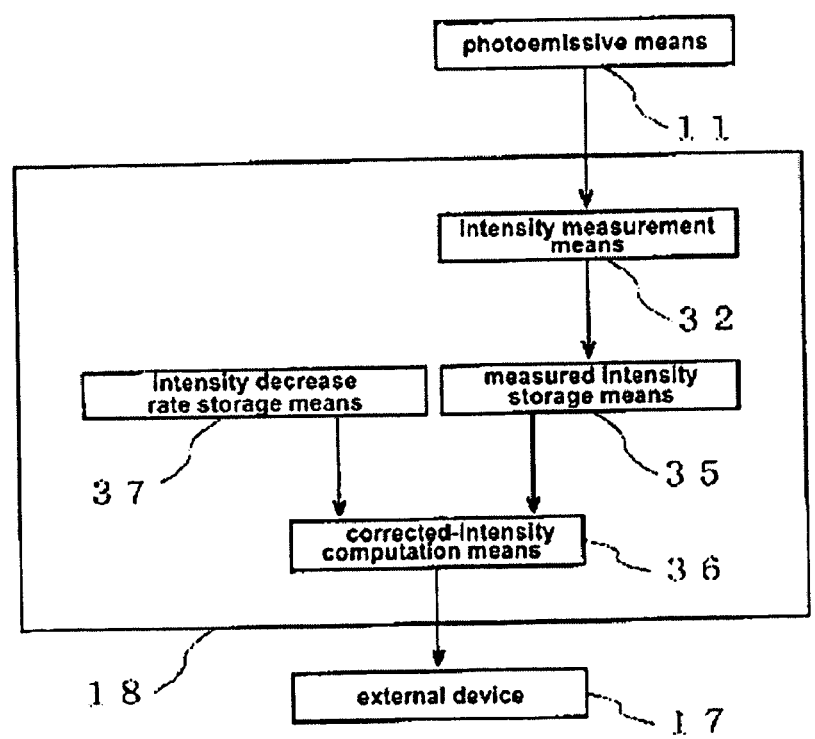
FIG. 7 shows a functional block diagram showing an example of the deformation of the diffraction pattern intensity correction means shown in FIG. 5.

To be specific, as shown in FIG. 7, as the aforementioned deformation example of the third embodiment, the intensity correction program may be one that utilizes, via a halation-prevention filter (not shown) that varies the transmittance when transmitting the visible light emitted from the diffraction pattern of the fluorescent screen as the result of reflection high-energy electron diffraction, so that it is minimal at the filter center and increases with the distance from the center, the diffraction pattern intensity correction means 18 that implements the measured intensity storage means 35 that stores the intensity, as measured by the photoreceptive means 11, of the visible light emitted from the diffraction pattern of the fluorescent screen, the intensity decrease rate storage means 37 that stores the rate of decrease of the intensity of the visible light transmitted through the halation-prevention filter, and the corrected-intensity computation means 36 that computes the corrected intensity of the diffraction pattern by correcting the intensity stored by the measured intensity storage means 35, based on the decrease rate stored by the intensity decrease rate storage means 37.

Here, as aforementioned, the intensity decrease rate storage means 37 stores, as default correction parameters, the intensity decrease rates appropriate to the specifications and the preset data for the halation-prevention filter and the photoreceptive means 11. Furthermore, regarding the data structure of this intensity decrease rate storage means 37, the adopted structure is such that the intensity decrease rate $T(x_i, y_i)$ and the position coordinates $(x_i, y_i)$ are related, instead of the measured intensity $I(x_i, y_i)$ shown in FIG. 6.

Even if such a deformation example is used, it is possible to correct the intensity of the diffraction pattern obtained via the halation-prevention filter and it is possible to obtain the intensity of the visible light actually emitted from the diffraction pattern of the fluorescent screen, because the following are implemented via a halation-prevention filter (not shown) that is varied so that the transmittance increases with the distance from the center: the measured intensity storage means 35 that stores the diffraction pattern intensity measured by the photoreceptive means 11, the intensity decrease rate storage means 37 that stores the rate of decrease in the intensity of the visible light transmitted through the halation-prevention filter, and the corrected-intensity computation means 36 that computes the corrected intensity for the diffraction pattern by correcting the intensity stored by the measured intensity storage means 35, based on the decrease rate stored by the intensity decrease rate storage means 37. Furthermore, it provides an environment in which accurate intensity analysis can be performed simply.

Figure 8A:
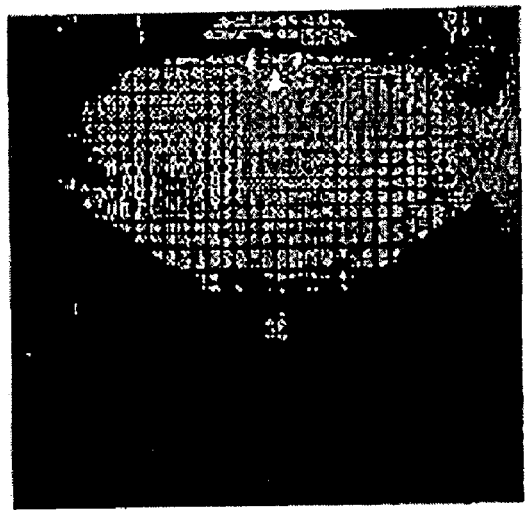
FIGS. 8(a) through 8(c) show photographs showing an example of the diffraction pattern, which were photographed without using the halation-prevention filter of the present invention.
Figure 8B:
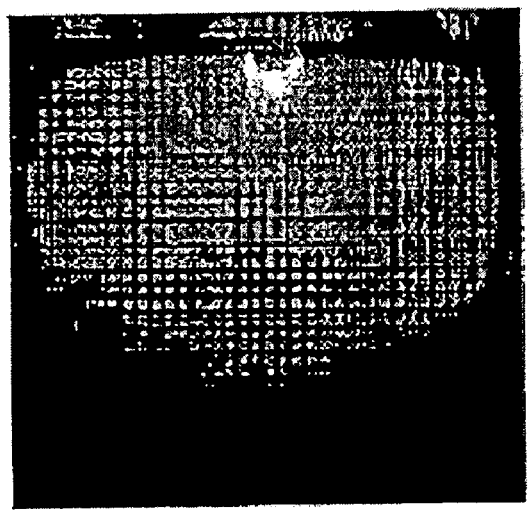
Figure 8C:
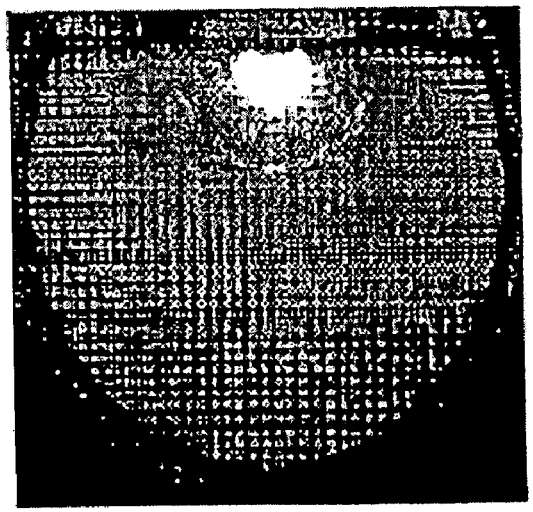
Figure 9:
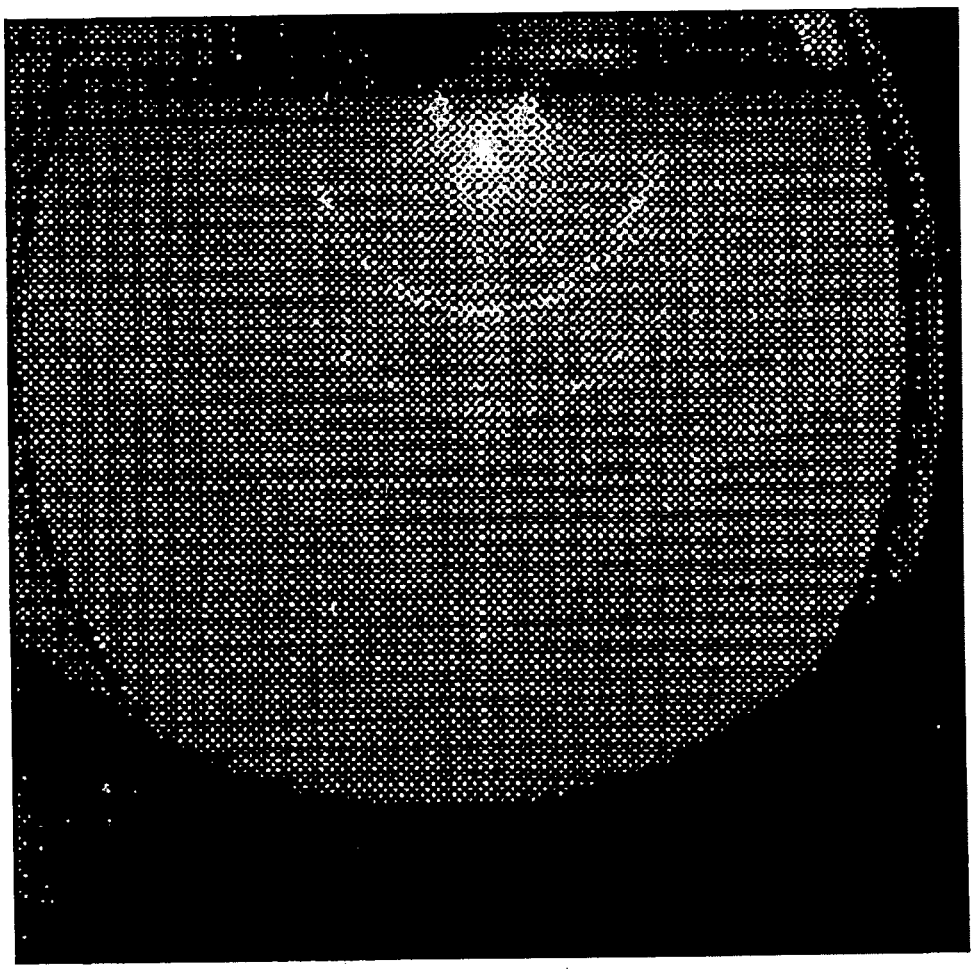
FIG. 9 shows a photograph showing an example of the diffraction pattern photographed by using the halation-prevention filter of the present invention.

Next, comparative examples of the use and nonuse of the previously described halation-prevention filter will be explained, with reference to FIGS. 8 and 9. FIG. 8 is a photograph taken with a CCD camera by means of a conventional method that does not use a halation-prevention filter, of the reflection high-energy electron diffraction pattern of an Si(111) single-crystal clean surface. FIGS. 8(a), 8(b), and 8(c) are photographs taken with different exposure times. Meanwhile, FIG. 9 is a photograph of the reflection high-energy electron diffraction pattern of a Si(111) single-crystal clean surface, which was taken with a CCD camera while using a halation-prevention filter.

FIG. 8(a) is the diffraction pattern obtained with a 0.5-sec. exposure time. FIG. 8(b) is the diffraction pattern obtained with a 1-sec. exposure time. FIG. 8(c) is the diffraction pattern obtained with a 2-sec. exposure time. Furthermore, the same diffraction pattern naturally is used as the target diffraction pattern.

In FIG. 8(a), the exposure time was insufficient, so there was no halation in the vicinity of the specular reflection point(s). However, because the Kikuchi pattern outside the first Laue zone is dark as the result of insufficient exposure, it cannot be determined.

If the exposure time is lengthened in order to determine the Kikuchi pattern outside the first Laue zone, the variation is as shown in FIGS. 8(b) and (c). To be specific, as shown in FIG. 8(b), when the exposure time is lengthened to 1 sec., the Kikuchi pattern in the vicinity of the first Laue zone becomes identifiable. However, halation occurs in the vicinity of the specular reflection point(s). Furthermore, when the exposure time is set to 2 sec. in order to verify the second Laue zone, etc., not only the vicinity of the specular reflection point(s), but also the inside of the zero-order Laue zone becomes completely halated, as shown in FIG. 8(c).

By contrast, FIG. 9 shows the diffraction pattern when using a halation-prevention filter with the filter gradation variation gradient (i.e., the transmittance variation) set to n=0.5. Furthermore, the photographed diffraction pattern is the same as the diffraction pattern in FIG. 8, and the CCD camera used for photography is also the same.

Then, under the conditions shown in the aforementioned FIG. 8, halation initially occurred in the vicinity of the specular reflection point(s). In view of this, when the diffraction pattern shown in FIG. 9 was photographed, the exposure time was set so that halation did not occur in the vicinity of the specular reflection point(s), as a comparative example for the photograph shown in FIG. 8. Furthermore, the exposure time was 4 sec.

As shown in FIG. 9, when a halation-prevention filter was used, it was possible to clearly photograph up to the Kikuchi pattern that appeared outside the second Laue zone, while maintaining a visible light intensity in the vicinity of the specular reflection point(s), that was similar to that in FIG. 8(a).

The present invention is configured and functions as aforementioned, by varying the filter transmittance so that it is lowest at the filter center and increases with the distance from the center, it is possible to supply an environment that yields the entire diffraction pattern without halation, even though the entire diffraction pattern is acquired optically.

Also, because the transmittance increases in proportion to the $n^{th}$ power of r, the distance from the filter center, it is possible to effectively and adequately reduce the light intensity in the vicinity of the center, compared with that in the periphery.

Furthermore, by varying the filter transmittance so that it is lowest at the filter center and increases with the distance from the center, it is possible in the photoreceptive means to obtain the intensity of the visible light emitted from the diffraction pattern on the fluorescent screen, within the allowable range of halation-free photoreception.

Also, because the transmittance increases in proportion to the $n^{th}$ power of r, the distance from the filter center, it is possible to effectively and adequately reduce the light intensity in the vicinity of the center, compared with that in the periphery.

The invention also has an in-plane or in-planar movement means, so it can provide a highly flexible halation-prevention mechanism that can respond to displacement of the specular reflection point(s) of the diffraction pattern.

The invention may provide an environment that enables accurate intensity analysis, because the rate of decrease in the intensity of the visible light transmitted through the filter is computed, and the corrected intensity resulting from the correction of the intensity of the visible light emitted from the diffraction pattern on the fluorescent screen is computed based on the decrease rate.

Also, the invention may provide a diffraction pattern intensity analysis method that enables accurate intensity analysis, because it is equipped with a process that measures the intensity of a diffraction pattern via a halation-prevention filter that is varied so that the transmittance increases with the distance from the center, a process that obtains the intensity decrease rate attributable to the filter, and a process that corrects the intensity of the diffraction pattern, based on the decrease rate.

In the present invention, because the transmittance increases in proportion to the nth power of r, the distance from the filter center, it is possible to provide a diffraction pattern intensity analysis method that can analyze, without halation, the intensity of the visible light emitted from the diffraction pattern of a fluorescent screen.

Also, the invention implements a measured intensity storage means that stores the intensity of the diffraction pattern measured by the photoreceptive means, via the halation-prevention filter varied so that the transmittance increases with the distance from the center, an intensity decrease rate storage means that stores the rate of decrease in the intensity of visible light transmitted through the halation-prevention filter, and a corrected-intensity computation means that computes the corrected intensity of a diffraction pattern by correcting the intensity stored by the measured intensity storage means based on the decrease rate stored by the intensity decrease rate storage means, thereby making it easy to obtain the intensity of the visible light actually emitted from the diffraction pattern of the fluorescent screen. Furthermore, it can provide simply an environment that enables accurate intensity analysis.

Furthermore, the invention implements an intensity measurement means that measures the intensity of the point light source measured by the photoreceptive means, via the halation-prevention filter varied so that the transmittance increases with the distance from the center, an intensity decrease rate computation means that computes the decrease rate based on the measured intensity and the reference intensity of the point light source when it does not pass through the halation-prevention filter, an intensity decrease rate storage means that stores its decrease rate, a measured intensity storage means that stores the intensity of the diffraction pattern measured by a photoreceptive means, via the halation-prevention filter, and a corrected-intensity computation means that computes the corrected intensity of a diffraction pattern based on the decrease rate stored by the intensity decrease rate storage means, so it enables the determination of the precisely corrected intensity of the visible light actually emitted from the diffraction pattern of the fluorescent screen.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A diffraction pattern intensity analysis method used to analyze intensity of visible light emitted from a diffraction pattern of a fluorescent screen as a result of reflection high-energy electron diffraction, comprising the steps of:

using a photoreceptor to measure the intensity of the diffraction pattern that appears on the fluorescent screen, via a halation-prevention filter with a transmittance which is minimum at a filter center and increases with distance from the filter center;

based on a result of the measurement, obtaining a rate of decrease in the intensity of the visible light transmitted through the filter; and correcting the diffraction pattern intensity measured by the photoreceptor, based on the decrease rate.

2. The diffraction pattern intensity analysis method of claim 1, in which the transmittance of visible light transmitted through the filter increases in proportion to $r^n$, where r is a distance from the filter center.

3. A diffraction pattern intensity correction program for use with an image analysis device having a fluorescent screen for creating a diffraction pattern that results from reflection high-energy electron diffraction, a photoreceptor for optically acquiring the diffraction pattern that appears on the fluorescent screen, and a halation-prevention filter for location along a light path connecting the fluorescent screen and the photoreceptor, in which a transmittance of the visible light transmitted through the filter is minimum at a center of the filter and increases with a distance from the center, the program comprising:

a measured intensity storage means for storing an intensity of visible light emitted from the diffraction pattern on the fluorescent screen as a result of reflection high-energy electron diffraction, passed through the halation-prevention filter and detected by the photoreceptor means;

an intensity decrease rate storage means for storing a rate of decrease in the intensity of the visible light transmitted through the halation-prevention filter; and a corrected-intensity computation means for computing a corrected intensity of the diffraction pattern by correcting the intensity stored by the measured intensity storage means, based on the decrease rate stored by the intensity decrease rate storage means.

4. The diffraction pattern intensity correction program of claim 3, further comprising:

a point light source;

an emission controller for controlling the generation of light by the point light source;

an intensity measurement means for measuring, via the photoreceptor, the intensity of the visible light emitted from the diffraction pattern of the fluorescent screen and the intensity of the point light source-emitted visible light that passed through the filter;

an intensity decrease rate computation means for computing a rate of decrease in the intensity of the visible light transmitted through the filter, based on the intensity of the visible light emitted by the point light source, that was measured by the intensity measurement means; and a corrected-intensity computation means that, based on the decrease rate computed by the intensity decrease rate computation means, computes the corrected intensity used to correct the intensity of the visible light emitted from the diffraction pattern of the fluorescent screen, that was measured by the photoreceptor.

* * * * *